Sept. 23, 1952      E. A. LAMPE      2,611,667
SEALED SLEEVE BEARING UNIT
Filed Aug. 19, 1950
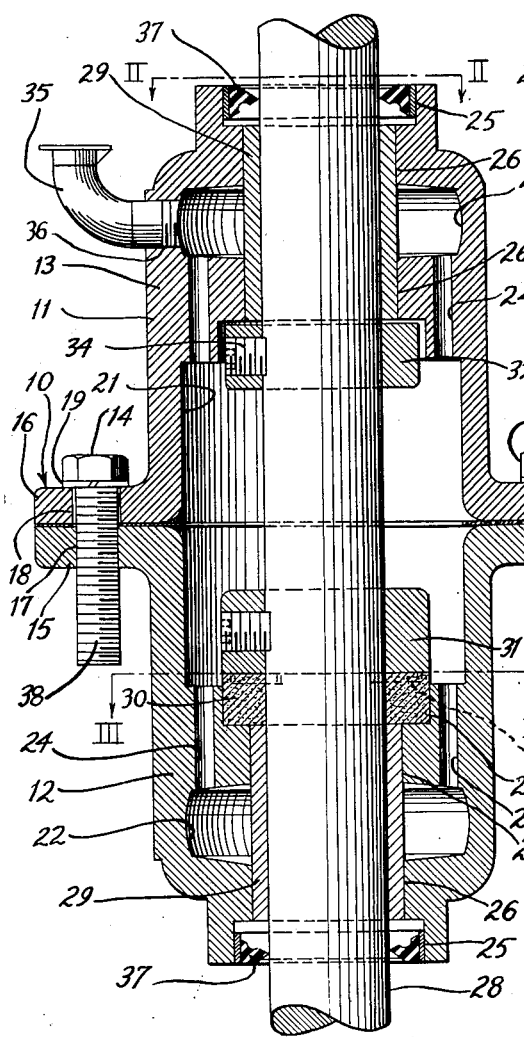
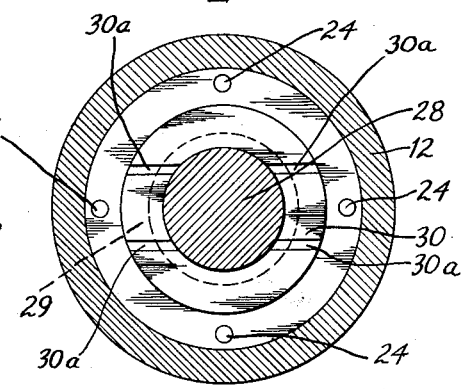
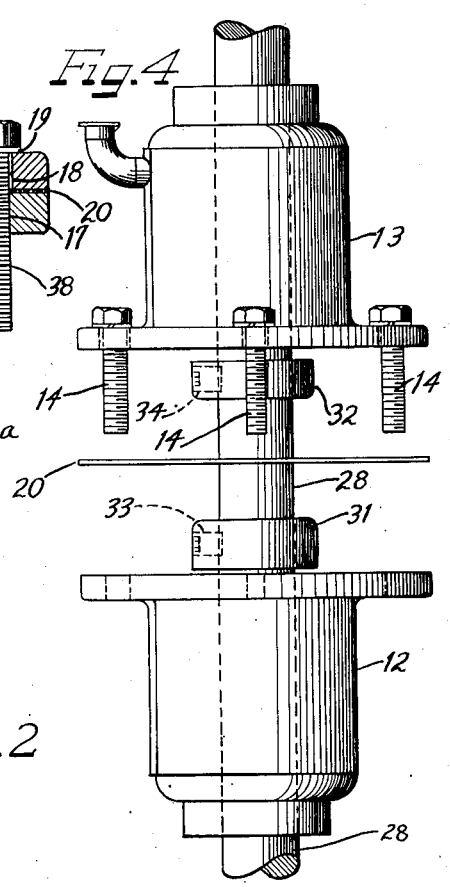
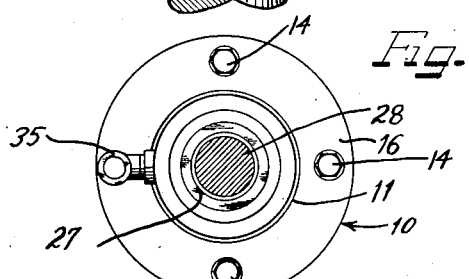
Inventor
ELMER A. LAMPE Patented Sept. 23, 1952

2,611,667

UNITED STATES PATENT OFFICE 2,611,667

SEALED SLEEVE BEARING UNIT

Elmer A. Lampe, Chicago, Ill.

Application August 19, 1950, Serial No. 180,373

7 Claims. (Cl. 308—168)

This invention relates to an improved sleeve bearing assembly which sealingly encloses both radial and thrust bearing members in a single assembled unit especially useful for installations where the use of separate bearings or pillow blocks are not adaptable.

More specifically, the invention relates to a sealed sleeve bearing assembly wherein the bearing housing member provides sealed lubricant chambers which contain shaft supporting bushings, thrust bearings, and bearings positioning collars.

According to the present invention, a pair of bearing housing members are detachably joined axially at mating flanges to make possible the assembly of one or more internal thrust bearings and locking collars, which are of necessity larger in diameter than the shaft diameter or inside diameter of the radial load carrying bushings. Each of the housing members contains a shaft support bushing of porous or ported metal which is pressed thereinto. A thrust bearing insert of carbon graphite or other suitable bearing material is pressed coaxially with the shaft support bushing into one or both of the bearing housing halves. Before the bearing halves are united, the shaft support bushings and thrust bearings are finish sized with proper operating tolerance for operation with a mating shaft. To assemble the bearing halves on the shaft, a pair of thrust or retaining collars are locked in proper position on the shaft and the housing halves are inserted over opposite ends, joined at the flanges, and rigidly held in position by bolts. Bolt holes in one of the housing members are slightly larger than the bolt diameter to permit radial adjustment of the housing halves for perfect axial alignment of the shaft through the previously finish sized supporting bushings. Thus, the thrust collars, the thrust bearing insert, and the shaft support bushings are enclosed therein. Seals are provided at each end of the assembled housing for retaining lubricant which is introduced thereinto.

It is, then, an object of this invention to provide an improved sleeve type bearing assembly with sealed ends for preventing the loss of lubricant and the ingress of dirt or foreign matter.

Another object of the invention is to provide a sealed sleeve type bearing unit in which the shaft supporting bushing in each of the housing halves can be individually finish sized on the inside diameter after being pressed into the halves before final assembly of the unit to correct distortion and closeup.

A further object of the invention is to provide a bearing unit which permits assembly of the larger diameter thrust collars on the shaft before the bearing housing is assembled thereover.

A specific object of this invention is to provide a sealed sleeve type bearing unit for use in a vertical position in which bearing housing is formed of two mating halves which enclose shaft support bushings, thrust bearing inserts and thrust collars, all operating in a sealed oil reservoir.

Another specific object of the invention is to provide a sealed sleeve type bearing unit including a housing of separable halves which may be assembled over previously positioned thrust collars on a cooperating shaft within the housing in a lubricant bath.

Other and further objects of the invention will be apparent to those skilled in the art from the following detailed description of the accompanying sheet of drawings which, by way of preferred example, illustrate one embodiment of the invention.

On the drawings:

Figure 1 is a longitudinal cross-sectional view of the sleeve bearing unit of this invention with parts in side elevation;

Figure 2 is a reduced size end elevational view, with a part in horizontal cross section, taken along the line II—II of Figure 1;

Figure 3 is a sectional view taken substantially along line III—III of Figure 1;

Figure 4 is a reduced size elevational view showing the two halves of the bearing body member separated for receiving the shaft and to illustrate the manner in which the unit of Figures 1 to 3 is assembled.

As shown on the drawings:

In Figure 1 is illustrated a sealed sleeve bearing assembly, generally designated as 10, having a body casing or housing member 11 which comprises a pair of castings or housing halves 12 detachably joined substantially coaxially by means of bolts 14. The bolts 14 extend through substantially abutting circular flanges 15 and 16 cast radially outwardly at the inward ends of the body halves 12 and 13, respectively. The flange 15 has internally threaded holes 17 and the flange 16 has corresponding relatively enlarged holes 18 therethrough, each set of coaxial holes 17 and 18 being adapted to receive one of the bolts 14 therethrough. Each of the bolts 14 is threadedly inserted through one of the holes 17 and has its shank in generally spaced relationship within the holes 18 for permitting adjustment of the axes of the halves 12 and 13 with respect to one another to permit exact alignment of the shaft supporting bushings to be described below. Lock washers 19 may be provided between the heads of the bolts 14 and the face of the flange 16 to prevent inadvertent loosening of the bolts. An annular gasket 20 is provided between the abutting faces of the flanges 15 and 16 to prevent leakage therebetween.

Each of the body halves 12 and 13 contains a relatively large circular chamber 21 open at the flanged ends thereof. The chambers 21 are connected to internal annular recesses or chambers 22 located axially outwardly of the chambers 21, as seen in Figure 1, by means of a plurality of passageways 24, herein shown as four in number in each of the body halves. The opposite ends of the body halves 12 and 13 contain short annular recesses 25. An axial bore 26 is formed through each of the body halves. An annular recess 27 of smaller diameter than the chamber 21 is provided about the axially inward end of the bore 26 to open into the chamber 21 of each of the body halves.

For providing radial support bearings for a shaft 28 of circular cross section, which is inserted through the bore 26 of the body halves 12 and 13, a shaft supporting bushing 29 of porous or ported bearing material is pressed into place in the bore 26 in each of the body halves. The bushings 29 are coextensive with the bore 26. Thus, the annular chambers 22 are closed except to the chambers 21 through passages 24.

An annular thrust bearing insert 30 of carbon graphite or other suitable bearing material is pressed into place in the annular recess 27 within the body half 12 and has its axially outward side abutting the axially inwardly facing surface of the recess. The axially inward end portion of the thrust insert 30 extends into the chamber 21 providing a raised annular boss therein to allow for subsequent wear of the bearing. A plurality of lubricant channels or grooves 30a may be formed across the surface of the insert 30 which faces the chamber 21 in order to insure a sufficient supply of lubricant on this surface during operation of the bearing assembly. The annular recess 27 of the body half 13 may also be provided with a thrust bearing insert 30, but as therein shown does not contain such an insert.

To properly position the bearing assembly 10 on the shaft 28 and to provide a thrust bearing surface to coact with the thrust bearing insert 30, a pair of annular thrust or retaining collars 31 and 32 are provided adjacent the insert 30 and within the annular recess 27 of the body half 13, respectively. The collars 31 and 32 are retained in properly positioned relationship on the shaft 28 by means of set screws 33 and 34, respectively. A slight running clearance is provided between the abutting faces of the thrust or retaining collar 32 and the recess 27. It will be noted that the thrust collar 31 is approximately the same diameter as the thrust insert 30 while the thrust or retaining collar 32 is of smaller diameter in order to fit within the recess 27 without interference therewith. It is readily apparent that the bearing assembly illustrated in Figure 1 is intended to operate with a downward thrust load acting on the shaft 28 so that all of the running clearance will be between the top thrust or retaining collar 32 and the end of the recess 27 during operation of the assembly.

According to this invention, the thrust collars 31 and 32 may be assembled in proper spaced relationship on the shaft 28 before the bearing assembly 10 is assembled thereon. Figure 4 shows the collars fixedly attached in proper relationship on the shaft with the body halves 12 and 13 assembled over the shaft but not yet attached to one another. This arrangement permits ready access to the interior of the bearing assembly in order to adjust the thrust bearing running clearance which may change due to wear and in order to inspect the various bearing surfaces and permit expeditious replacing of any of the bearing or bushing members which may have become too badly worn.

The bearing assembly illustrated is especially useful for vertical operation with attic ventilating fans or the like where the rotating parts operating in a reservoir or bath of oil insure absolute quietness of operation and eliminate objectionable bearing noises but may, of course, be utilized in a great number of different applications requiring similar bearing characteristics. The recesses 21 and 22 within the assembled bearing provide inter-connected lubricant reservoirs in order to insure that all of the mating bearing surfaces are constantly supplied with full lubrication. Since the bearing assembly shown in Figure 10 is intended for vertical operation with the body half 13 upwardly, the oil reservoirs within the body member 11 are filled with lubricant through a right-angular oil cup 35 which has one end threadedly inserted through a threaded hole 36 through the wall of the body half 13 into the annular chamber 22 therein.

In order to seal the opposite ends of the bearing assembly 10 to prevent loss of oil therefrom and to prevent the ingress of dirt and other foreign matter thereinto, resilient seals 37 of synthetic compound or other deformable sealing material are fixedly disposed within the recesses 25 and bear resiliently and continuously in slidable sealing relationship about the periphery of the shaft 28.

Means are provided for attaching the assembled bearing unit to a main stand frame support or the like (not shown), and herein such means comprise extensions 38 of the bolts 14 which may be inserted through mating holes in the support.

Thus, it will be seen that this invention provides a simple, dependable and easily adjustable sealed sleeve bearing assembly in which radial loads of a rotating shaft are transmitted to the body section of the bearing assembly through a pair of shaft supporting bushings and in which thrust loads on the shaft are transmitted from the shaft through a fixedly attached thrust collar to a thrust bearing which is fixedly attached to the body of the bearing assembly. The ends of the bearing assembly are sealed about the shaft, and lubricant-filled connected reservoir chambers within the bearing housing provide means for insuring a continuous lubricant bath to all of the mating bearing surfaces. To assist in the lubrication, the shaft supporting bushings are made of porous or ported material to insure the free passage of lubricant therethrough for lubricating the shaft journals.

The body member of the bearing assembly is formed in two halves which may be readily molded or die cast from the same mold. This arrangement permits pre-assembly of the thrust collar and a thrust or retaining collar in proper relationship on the shaft before the halves of the bearing unit are assembled thereover. This arrangement also permits simple and accurate inside diameter sizing of the shaft supporting bushings individually after they are pressed into each of the body halves. The body halves are assembled by means of mating bolted flanges, and perfect alignment therebetween is assured by means of enlarged bolt holes in the flange in one of the body halves which insure that the halves are in proper alignment before the attaching bolts are tightened.

It will be understood that modifications and variations may be effected without departing from the scope of the novel concepts of the present invention.

I claim as my invention:

1. A bearing assembly comprising a body member having two mating half-sections defining lubricant chambers therein, a sleeve bushing of porous bearing material fixedly disposed in each of said half-sections, a rotatable shaft positioned through said body member in bearing contact with said sleeve bushings, a thrust bearing insert fixedly disposed in at least one of said half-sections and disposed about said shaft, a thrust collar fixedly attached to said shaft adjacent said thrust insert to coact therewith to transmit thrust loads from the shaft to the body member, a retaining collar fixedly attached to said shaft for preventing substantial axial movement of the shaft in a direction tending to separate said thrust collar and said thrust insert, said thrust and retaining collars being disposed in such a position within said half-sections of the closed bearing assembly to allow removal of the mating half-sections over opposite ends of the shaft without moving of the collars, resilient lubricant sealing rings at each end of said bearing assembly to prevent the loss of lubricant therefrom, and means for introducing lubricant to the lubricant chamber within the closed bearing assembly.

2. A bearing assembly for receiving a rotatable shaft comprising a body member having lubricant chambers therein, resilient lubricant-resistant seals disposed about the shaft at each end of the bearing assembly, shaft supporting bushings fixedly disposed axially inwardly of said seals in said body member and having bearing surfaces surrounding the shaft, a thrust bearing insert fixedly disposed in said body member between said bushings and having a thrust bearing surface in angular relation to the bearing surfaces of the bushings, and thrust retaining collars fixedly attached to the shaft and disposed between said thrust bearing insert and one of said shaft supporting bushings, one of said collars coacting with said insert to transmit thrust loads from the shaft to the body member, and said bearing surfaces being in communication with said lubricant chambers within said body member for continuous lubrication of said surfaces.

3. A bearing assembly for receiving a rotatable shaft or the like comprising a body member having two mating half-sections defining lubricant chambers therein, said half-sections having mating flanges with substantially coaxial bolt holes therethrough, the bolt holes through the flange on one of said halves being of larger diameter than those through the flange of the other half, attaching bolts through said holes for attaching said half-sections, said enlarged bolt holes accommodating relative radial adjustment of the half-sections, shaft supporting bushings fixedly disposed within said body member each having a bearing surface for surrounding a shaft, a thrust bearing having a bearing surface in angular relation to the bearing surfaces of said bushings, and sealing means at both ends of said body member for preventing loss of lubricant from the reservoirs while permitting free lubrication of the bearing surfaces of the bushings and thrust bearing means therein.

4. A bearing assembly for receiving a rotatable shaft comprising a body member having two mating half-sections, a shaft supporting bushing fixedly attached in each half-section, attaching means accommodating relative shifting of the half sections to align the bushings therein before fixedly attaching said half-sections to one another, adjustable thrust bearing means disposed within said body member, and said thrust bearing means being accessible for adjustment and for replacement by disengagement of said attaching means to allow separation of said mating half-sections.

5. In a sealed sleeve bearing assembly having separable mating half-sections together forming a closed body member and having a sleeve bushing fixedly disposed within each half-section for receiving a rotatable shaft extending through the body member, the improvement which comprises thrust bearing means including thrust collars fixedly attachable to a rotatable shaft extending through the closed body member, the half-sections being separable from a closed position about said thrust collars to allow adjustment of said collars to adjust the thrust bearing means and to properly position the bearing assembly relative to a shaft extending through the body when the halves are reassembled over the collars.

6. A sealed sleeve bearing assembly for receiving a rotatable shaft comprising a body member having two mating half-sections defining lubricant chambers therein, attaching means accommodating relative shifting of the half-sections before fixedly attaching said mating half-sections to one another, sealing means at each end of the body member for retaining lubricant therein, a bushing in each of said half-sections located between the sealing means at each end of the body member, and adjustable thrust bearing means located between said bushings, said bushings and said thrust bearing means being continuously lubricated from said lubricant chambers without the loss of lubricant from the bearing assembly.

7. A sealed radial and thrust sleeve bearing comprising a pair of casings, a sleeve bearing secured in each casing, attaching means initially accommodating relative radial displacement of the casings to align the sleeve bearings before securing the aligned casings together in fixed relation, a shaft extending through said sleeves, and opposed means on said shaft between said sleeves positioned in thrusting relation with said casings to limit end play of the shaft.

ELMER A. LAMPE.

REFERENCES CITED

The following references are of record in the file of this patent:

UNITED STATES PATENTS

| Number | Name | Date |
| --- | --- | --- |
| 756,775 | Brett | Apr. 5, 1904 |
| 1,188,484 | Phohl | June 27, 1916 |
| 1,772,120 | Vogel | Aug. 5, 1930 |